Sept. 18, 1928.

C. T. HIBBARD 1,685,054

DYNAMO ELECTRIC MACHINE

Filed Nov. 24, 1926 — 2 Sheets-Sheet 1

INVENTOR
Charles Truman Hibbard
BY
Fennie Davis Marvin Edmonds
ATTORNEYS

Sept. 18, 1928.  
C. T. HIBBARD  
DYNAMO ELECTRIC MACHINE  
Filed Nov. 24, 1926  
1,685,054  
2 Sheets-Sheet 2
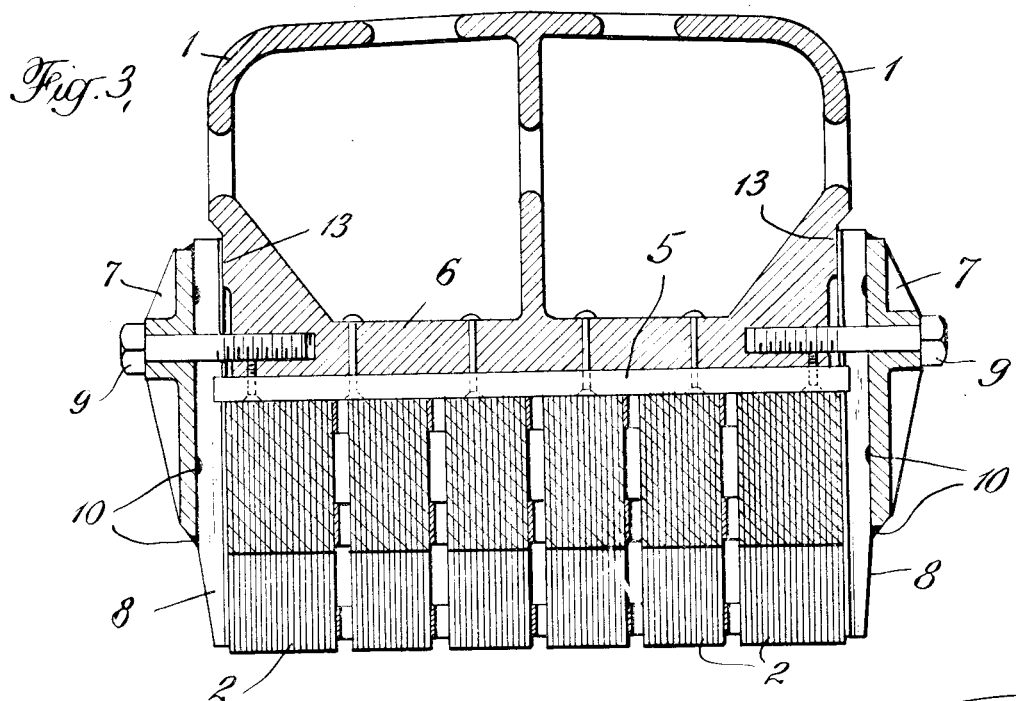
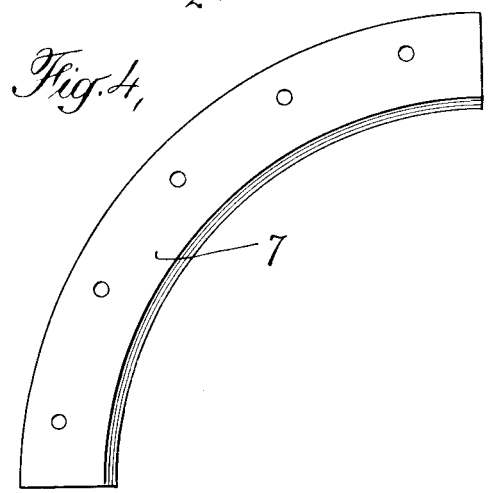
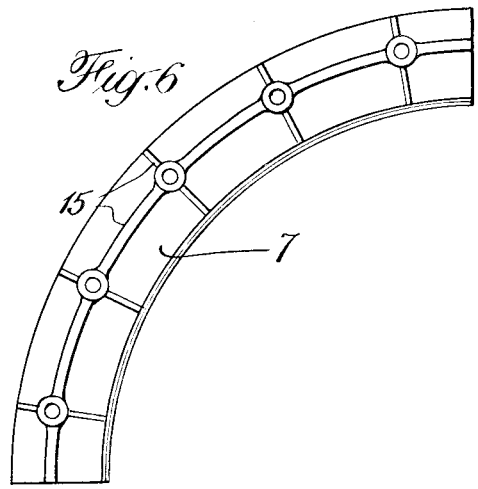
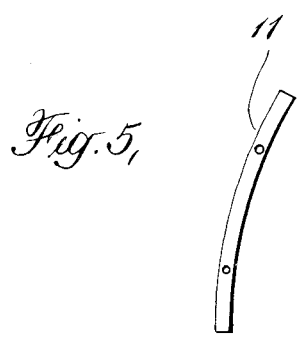
INVENTOR  
Charles Truman Hibbard  
BY  
ATTORNEYS Patented Sept. 18, 1928.

1,685,054

UNITED STATES PATENT OFFICE.

CHARLES TRUMAN HIBBARD, OF MINNEAPOLIS, MINNESOTA, ASSIGNOR TO ELECTRIC MACHINERY MFG. COMPANY, OF MINNEAPOLIS, MINNESOTA, A CORPORATION OF MINNESOTA.

DYNAMO-ELECTRIC MACHINE.

Application filed November 24, 1926. Serial No. 150,421.

This invention relates to dynamo-electric machines, particularly to the core construction of such machines, and has for its object the provision of an improved form of rotor or stator construction capable of maintaining substantially parallel support of the core at both ends at all times and providing a variable compression adjustment.

The usual form of rotor or stator construction for dynamo-electric machines constitutes a laminated core built up of thin sheet steel stampings positioned in a channeled frame or yoke ring in the case of a stator, and around the periphery of a drum or mandrel frame in the case of a rotor. Ordinarily, the frame of both rotor and stator are of cast steel cast iron or fabricated steel. The stampings are usually of segmental shape and are provided on one edge with slots for the reception of the armature coils. The opposite edge of each segmental sheet is customarily provided with one or more notches for keys which are inserted in the frame, or with projections which fit into slots cut in the frame. The separate laminations are built up with lap joints in the frame and securely bolted together between end plates or between the sides of the frame. To permit ventilation of the core, the frame is usually of hollow construction and provided with numerous openings, and the laminations are separated at one or more points by the insertion of spacers in order to provide radial air ducts for circulating the cooling air.

The manner in which the laminations are held in place in the stator or on the rotor varies considerably, although it depends somewhat upon the size of the machine. Ordinarily, the core is clamped between two end plates, one of which may be cast integral with the frame, while the other may be a loose follow ring fitting against the frame and held in place, after the core has been properly compressed, by bolts, pins, keys, rivets or other suitable means. Or, both end plates may be loose follow rings, in which case the separate rings are either clamped together or secured to the corresponding sides of the frame.

Since the core is built up of a plurality of thin steel laminations separated by ventilating spacers, it is a compressible body without definite or exact dimensions. The core may be compressed to its smallest possible dimensions, in which case it will have excessive core loss, or it may not be sufficiently compressed and result in vibration and noise and chafing of the coils. The adjustment of the core to the proper degree of compression is not always a simple or a convenient adjustment to make. The laminations while of more or less prescribed size vary somewhat in thickness, and the coating of core plate varnish with which the individual sheets are painted is also subject to considerable variation in thickness. The actual variation of each lamination and each varnish coating may be very small, but when the entire core is composed of many laminations is assembled the resulting variation from the calculated thickness of the core may be as much as several laminations. The completed core thus will not fit the place designed for it on the stator or rotor frame and the clamping means will not properly hold the ill fitting core together. Shrinkage of the core during use may also occur.

In order to overcome such objectionable features as are inherent in the usual form of core construction, I have devised a form of stator or rotor construction permitting a flexibility in the adjustment of the clamping rings, both for convenience in manufacture and also for correction of any error that may be made during the assembling of the core due to clamping the core too tightly or not tight enough. Thus, I provide clamping means that may be adjusted to fit the particular dimensions of each core, and that at the same time satisfy the requirements of ease of assembling, proper ventilation and prevention of flaring of the outer tips of the core teeth.

According to my invention I may clamp the core between substantially parallel plates capable of being readily and accurately adjusted to either tighten or loosen the core laminations, even after the armature coils are in place. Because of my improved clamping means, I may reduce the width of the frame and form a machine considerably narrower than those now in use, thereby improving the ventilation of the machine as well as reducing the manufacturing and shipping costs of the frame castings.

Also, the follow plates, as contemplated by this invention may have welded thereto the individual tooth supports thus preventing loosening of the supports because of wear, and vibration between the follow plates and the supports. The loosening and falling out of the tooth supports may thereby be eliminated and the danger of damage to the machine during operation thus averted. As a further safeguard against flaring of the outer tips of the teeth I may provide means whereby the clamping effect of the follow plates may be transmitted to the extremities of the teeth.

Other provisions and features of my invention as well as those already discussed may be better understood by considering the following detailed description which is to be taken in consideration with the accompanying drawings, wherein—

Fig. 3 is a cross sectional view of a modified form of my improved stator construction.

Fig. 4 is a plan view of a segment of a follow plate.

Fig. 5 is a plan view of a segment of a fulcrum ring.

Fig. 6 is a plan view of a segment of another form of follow plate.

Figure 1:
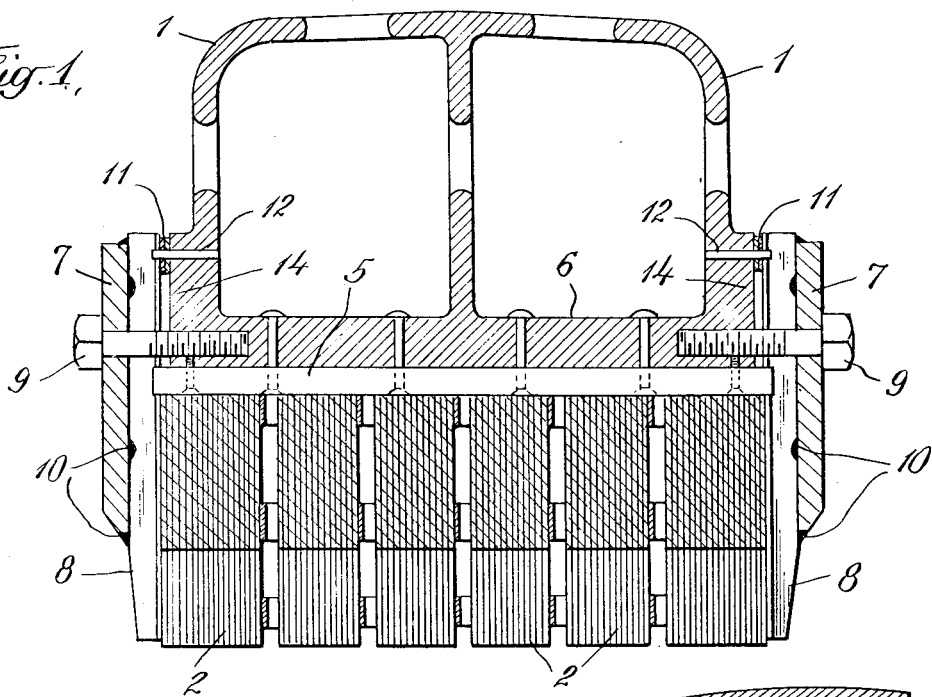
Fig. 1 is a cross sectional view of an improved stator assembly as contemplated by my invention.
Figure 2:
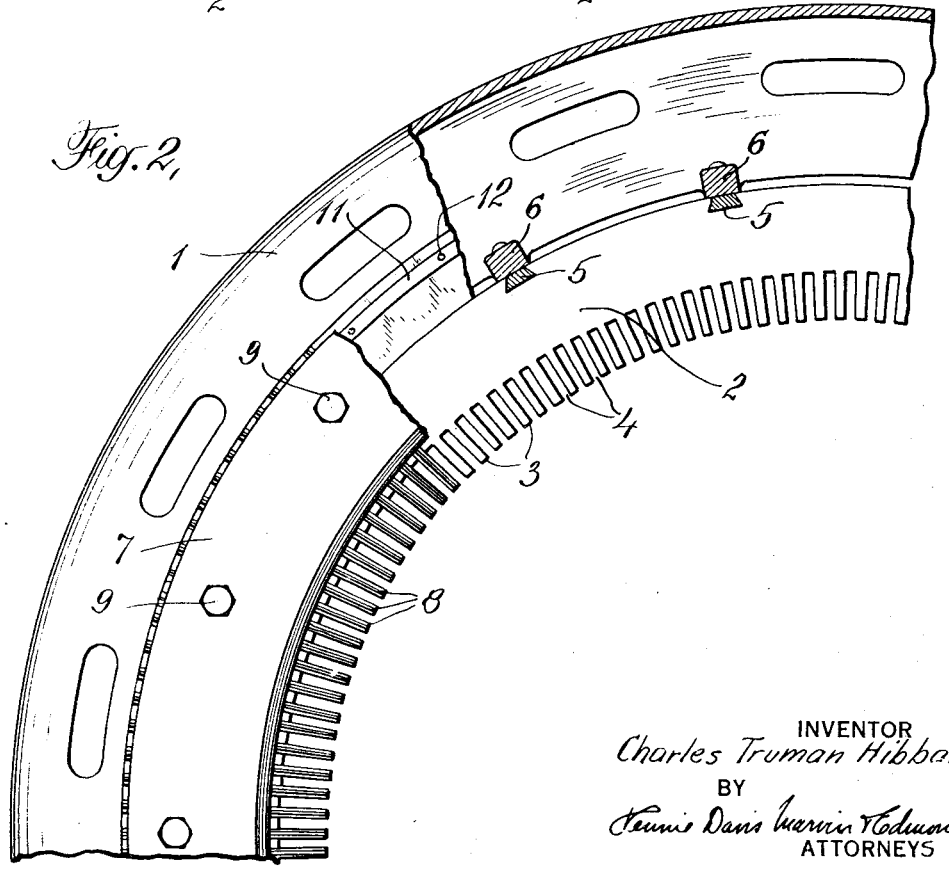
Fig. 2 is a side elevation of a portion of an improved stator constructed in accordance with my invention.

While I have illustrated an embodiment of my invention as applied to a form of stator construction only, I have done so merely for the purposes of simplicity of description. It is to be understood that an equivalent embodiment may be applied equally as well to a rotor construction without departing from the scope of my invention. The core construction I have devised is not limited to the particular embodiment shown and described but is intended to be applicable to either a laminated rotor or stator core of the type employed in dynamo-electric machines.

In the embodiment of the invention illustrated in the drawings, a stator frame 1 for a dynamo-electric machine is shown as a hollow casting provided with numerous openings for the passage of ventilating air currents. Secured to the inner surface of the frame is the laminated stator core 2 provided with teeth 3 and slots 4 for the reception of the stator coil windings. The stator core laminations are held in the stator frame 1 by suitable means such as dovetail keys 5 secured to transverse ribs 6 in the stator frame. The core illustrated in the drawings is built up of segmental laminations each of a length equal to twice the distance between the keys, and alternate segments are staggered so as to break joints between adjacent layers.

The core is clamped together by means of follow plates or clamping rings 7 disposed on opposite sides of the core. The teeth of the core, extending beyond the width of the follow plates 7 are supported on each side by tooth supports 8 formed of thin metal strips of rectangular cross section, I beam section or T section, depending upon the length of the teeth and the strength necessary to maintain the teeth in clamped position. One support is provided for every tooth and it extends as close to the tip of the tooth as is practicable. The follow plates 7 are arranged outside of the tooth supports 8 and transmit their clamping action to the supports.

The plates 7 may be of cast steel, cast iron or other cast material or they may be of flat, mild steel rolled into a circular ring to fit the dimensions required. For unusually deep cores a cast steel follow plate of the type illustrated in Fig. 6 may be employed. For strength and rigidity, as well as light weight, the plate may be of relatively light section provided with radial and circumferential ribs 15 and bosses for the clamping bolts. The plates may be cast in quarter or half circles for convenience in handling and assembling. For shallow cores, such as are usually found on small machines, the following plate may be formed of a flat rolled ring of mild steel, as illustrated in Fig. 4. Since the clamping action need not be transmitted very far from the bolts in a shallow core, reinforcing ribs and bosses are unnecessary. The flat plate may be rolled in quarter or half sections for the same reasons as attended the casting of the heavier type of ring. Folding the follow rings against the core are the bolts 9, which may be tapped into the stator frame or otherwise secured. When cast steel follow plates are used, the bolts are centered in the reinforcing ribs and bosses thereby increasing the clamping strength of the plates.

Since the tooth supports 8 are necessarily of small section in order to extend along the teeth, the contact area between the edges of the supports 8 and the face of the clamping rings 7 is very small. To prevent loosening of the supports they are welded at various points 10 to the follow plates 7. The entire clamping action of the plates 7 is therefore transmitted without loss directly to the tooth supports. The welding holds the supports perpendicular to the face of the follow plates and prevents buckling under of individual supports because of any slight unevenness on the surface of the teeth.

In order that as much of the clamping action of the follow plates may be transmitted along the body of the core and to the tip of the teeth, the tooth supports are fulcrumed at their inner ends on a fulcrum ring 11 consisting of one or more laminations or steel strips curved to conform to the curvature of the stator frame. The location of the fulcrum rings is such that the rings bear against the tooth supports on the other side of the bolts. A tightening of the bolts will therefore cause a fulcrum action of the supports about the rings 11 and a transmission of the clamping force to the tips of the teeth and along the body of the core parallel to the edge of the tooth supports 8.

This fulcrum arrangement permits of a certain degree of flexibility in the clamping force available at the tips of the teeth and along the body of the core because of the fact that the follow plates and tooth supports are rigidly supported only at the extreme inner end. Thus, the bolts may be tightened more or less and the compression of the core appreciably varied without changing the thickness of the fulcrum ring 11. If, however, a greater change is desired than that obtainable by manipulating the bolts, one or more laminations of the fulcrum ring may be removed permitting the tightening of the core an amount equal to the thickness of the laminations removed. If further tightening is necessary, additional laminations may be removed. With two laminations at each end, for example, four different adjustments are possible in addition to the flexibility of clamping with a fixed fulcrum, as already mentioned.

To hold the fulcrum rings in place upon the frame in such a manner that laminations may be removed from the rings without seriously affecting the securing means, dowel pins 12 are provided driven into suitable holes in the frame. The pins 12 project through the fulcrum rings between the tooth supports 8. The dowels 12 are not tapered but are slightly bent so that they may be repeatedly driven into the holes in the frame without becoming loose, as successive laminations are removed from the fulcrum rings. When it is desired to remove a lamination, the pin is driven into the frame far enough to clear the lamination to be removed and the lamination may then be pried off with a suitable tool. In order to facilitate handling as well as removal of laminations during adjustment, the fulcrum rings are preferably formed in relatively short sections, as indicated in Fig. 5. Thus, each section may be about the length of a stator core segment and each section should be supported by at least one dowel pin.

A modified form of stator construction utilizing the fulcrum feature in a somewhat different manner is illustrated in Fig. 3. In this case instead of the rim of the stator frame being smooth it is provided with a machined shoulder 13. The tooth supports instead of resting at their inner ends upon a fulcrum ring attached to the frame and projecting from it rest directly upon a projection machined from the face of the frame itself. The detachable fulcrum rings may thus be eliminated. To provide for various adjustments equivalent to those afforded by the lamination fulcrum rings 11, the shoulders 13 may be machined down to various dimensions depending upon the requirements of the core.

An important advantage rising out of my improved form of stator or rotor construction is that the same stator or rotor casting may be used for cores varying in width by as much as two inches and more. This is done by casting the frame with a considerable boss 14 on each side. If the frame is to be used with a core requiring the full width of the bosses only finishing need be done. On the other hand, if a narrower core is used the bosses may be machined down to the proper size required for the particular core. A wide variation in frames may thus be obtained by the use of but a single casting pattern.

It is to be understood that the arrangement of the various parts of my improved rotor or stator core construction may be varied without departing from the scope of the invention, which is not limited by the particular embodiment shown and described, but which includes such modifications thereof as fall within the scope of the appended claims.

I claim:

1. In a dynamo-electric machine the combination of a frame, a laminated core associated with said frame, and independently adjustable means for variably compressing the core arranged on opposite sides thereof, said means bearing on the side faces of the frame whereby said core may be made of the same width as said frame.

2. In a dynamo-electric machine the combination of a frame, a laminated core associated with said frame and independently adjustable means for variably compressing the core arranged on opposite sides thereof, said means being fulcrumed on projections on the side faces of said frame and bearing against the sides of the core to maintain substantially parallel support thereof at both sides and under all degrees of adjustment.

3. In a dynamo-electric machine the combination of a frame, a laminated core associated with said frame, said core having a plurality of teeth on its periphery, and independently adjustable means for variably compressing the core arranged on opposite sides thereof and adapted to transmit a variable compressing action along the body of the core to the tips of the core teeth, said means bearing on the side faces of said frame.

4. In a dynamo-electric machine the combination of a frame, a laminated core associated with said frame, said core having a plurality of teeth on its periphery, a plurality of supports arranged on opposite sides of the core and extending along the body of the core and along said teeth, and independently adjustable clamping plates for variably compressing the core arranged on opposite sides thereof outside of said tooth supports, said supports extending substantially parallel with the sides of the frame outside thereof.

5. In a dynamo-electric machine the combination of a frame, a laminated core associated with said frame, said core having a plurality of teeth on its periphery, and a plurality of supports arranged on opposite sides of the core and extending along said teeth, said supports being fulcrumed at their outer ends on said frame and bearing at their inner ends against the core body and the core teeth.

6. In a dynamo-electric machine the combination of a frame, a laminated core associated with said frame, said core having a plurality of teeth on its periphery, a plurality of supports arranged on opposite sides of the core and extending along said teeth, said supports being fulcrumed at their outer ends on said frame and bearing at their inner ends against said core, and adjustable clamping plates for compressing the core superposed upon said supports and adapted to transmit a clamping action to said supports to vary the degree of compression of the core.

7. In a dynamo-electric machine the combination of a frame, a laminated core associated with said frame, said core having a plurality of teeth on its periphery, a continuous fulcrum projection on each side of said frame and projecting an adjustable distance therefrom, and a plurality of supports arranged on opposite sides of the core and extending along the teeth, said supports bearing at their outer ends against said fulcrum projection and at their inner ends against said core.

8. In a dynamo-electric machine the combination of a frame, a laminated core associated with said frame, said core having a plurality of teeth on its periphery, a continuous fulcrum projection on each side of said frame, a plurality of supports arranged on opposite sides of the core and extending along the teeth, said supports bearing at their outer ends against said fulcrum projection and at their inner ends against said core, and adjustable clamping plates for compressing the core superposed upon said supports and adapted to transmit a clamping action to said supports to vary the degree of compression of the core.

9. In a dynamo-electric machine the combination of a frame, a laminated core associated with said frame, said core having a plurality of teeth on its periphery, a plurality of supports arranged on opposite sides of the core and extending along said teeth, and independently adjustable clamping plates for compressing the core superposed upon said supports and rigidly affixed to each one thereof, whereby the entire clamping action of the plates is transmitted directly to the tooth supports to vary the degree of compression of the core.

10. In a dynamo-electric machine the combination of a frame, a laminated core associated with said frame, a fulcrum ring arranged on each side of said frame, said rings being of adjustable thickness whereby the distance which they project from the frame may be varied, and adjustable clamping means for compressing the core arranged on opposite sides thereof and bearing on said fulcrum ring.

11. In a dynamo-electric machine, the combination with a frame, of a core having a plurality of teeth on its periphery, of continuous fulcrum projections on both sides of said frame, clamping plates arranged on opposite sides of the core, and a plurality of tooth supports bearing on said fulcrum projections and affixed to and carried by said clamping plates.

12. In a dynamo-electric machine, the combination with a frame, of a core having a plurality of teeth on its periphery, of continuous fulcrum projections on both sides of said frame, adjustable clamping plates arranged on opposite sides of the core, and a plurality of tooth supports bearing on said fulcrum projections and extending along both sides of the teeth and rigidly affixed to one surface of said clamping plates.

13. In a dynamo-electric machine, the combination with a frame, of a core, continuous fulcrum projections extending laterally from both sides of said frame, and adjustable clamping means for compressing said core arranged on opposite sides thereof and bearing on said fulcrum projections.

14. In a dynamo-electric machine, the combination with a frame, of a core, a fulcrum ring on each side of said frame, and clamping means for compressing said core arranged on opposite sides thereof and bearing on said fulcrum rings.

15. In a dynamo-electric machine, the combination with a frame, of a core, an adjustable fulcrum ring on each side of said frame and clamping means for compressing said core arranged on opposite sides thereof and bearing on said adjustable fulcrum rings whereby the degree of compression of said core may be varied.

16. In a dynamo-electric machine, the combination with a frame, of a core having a plurality of teeth on its periphery, a fulcrum ring on each side of said frame, a plurality of supports arranged on both sides of said core and extending along said teeth, the outer ends of said supports bearing on said fulcrum rings, and means for varying the relation between said supports and said rings to vary the degree of compression of said core.

17. In a dynamo-electric machine the combination with a frame, of a core, and adjustable clamping means for variably compressing said core bearing on the side faces of said frame an appreciable distance from said core and extending substantially parallel with the sides of said frame.

18. In a dynamo-electric machine the combination with a core having a plurality of teeth on its periphery, of adjustable clamping means for compressing said core bearing on the side faces of said frame an appreciable distance from said core and adapted to transmit a variable clamping action to the tips of said teeth and to the core while maintaining substantially parallel support thereof.

19. In a dynamo-electric machine the combination with a frame, of a core having a plurality of teeth on its periphery, a plurality of supports arranged on both sides of said core and extending along said teeth, and adjustable clamping plates superposed upon said supports and contacting with the edges thereof, said supports being rigidly affixed along their contact edges to one surface of said clamping plates.

20. In a dynamo-electric machine, the combination with a frame, of a core having a plurality of teeth on its inner periphery, a fulcrum ring on each side of said frame, a plurality of supports arranged on opposite sides of said core and extending along said teeth, the outer ends of said supports bearing on said fulcrum rings, and adjustable clamping plates superposed upon said supports and contacting with the edges thereof, said supports being rigidly affixed along their contact edges to one surface of said clamping plates.

21. In a dynamo-electric machine having a frame and a core associated therewith, the combination with the frame, of projections of adjustable thickness extending laterally from the side faces thereof, whereby the frame may be adapted to cores of different widths.

22. In a dynamo-electric machine of the type described the combination with a frame, of means for attaching a core to said frame, means for clamping an attached core in position on said frame, and projections of adjustable thickness extending laterally from each side of said frame, whereby the distance between said clamping means may be varied to adapt the frame to cores of different widths.

23. In a dynamo-electric machine of the type described the combination with a frame, of means for attaching a core to said frame, means for clamping an attached core in position on said frame, and an abutment of adjustable thickness extending laterally from each side of said frame as a continuous projection integral therewith, whereby the distance between said clamping means may be varied to adapt the frame to cores of different widths.

24. In a dynamo-electric machine having a frame and a core associated therewith, the combination with the frame of means for varying the width of the core, and projections of adjustable thickness extending laterally from the side faces of said frame, whereby the frame may be adapted to cores of different widths.

In testimony whereof I affix my signature.

CHARLES TRUMAN HIBBARD.